United States Patent [19]

Blasbalg

[11] 4,355,597
[45] Oct. 26, 1982

[54] BIRD FEEDER CONSTRUCTION

[76] Inventor: Morton L. Blasbalg, 26 Sandro Dr., Warwick, R.I. 02887

[21] Appl. No.: 290,888

[22] Filed: Aug. 7, 1981

[51] Int. Cl.³ .............................................. A01K 39/00
[52] U.S. Cl. ................................. 119/51 R; 220/330; 220/95
[58] Field of Search ................. 119/51 R, 52 R, 53; 220/95, 17.2, 330, 331, 318, 322, 252, 288, 291

[56] References Cited

U.S. PATENT DOCUMENTS

| 2,179,906 | 11/1939 | Thompson | 220/331 |
| 2,295,909 | 9/1942 | Massey | 220/331 |
| 2,627,996 | 2/1953 | Dorner | 220/330 |
| 3,163,338 | 12/1964 | Gottseger | 220/95 |
| 3,568,641 | 3/1971 | Kilham | 119/51 |
| 4,179,039 | 12/1979 | Kawolics | 220/95 |

Primary Examiner—Robert A. Hafer
Attorney, Agent, or Firm—Robert J. Doherty

[57] ABSTRACT

A bird feeder comprising a vertically disposed hollow housing having an opening in the upper end thereof and adapted to be closed by a closure cap. The feeder body is supported by a generally U-shaped bail having opposed legs connected to the body at the upper end thereof. One of the legs of the bail is frictionally removable from its connection with the housing body for ease in mounting the feeder construction and the closure is freely rotatable about the other of the bail legs for ease in introducing feed into the housing body.

5 Claims, 6 Drawing Figures

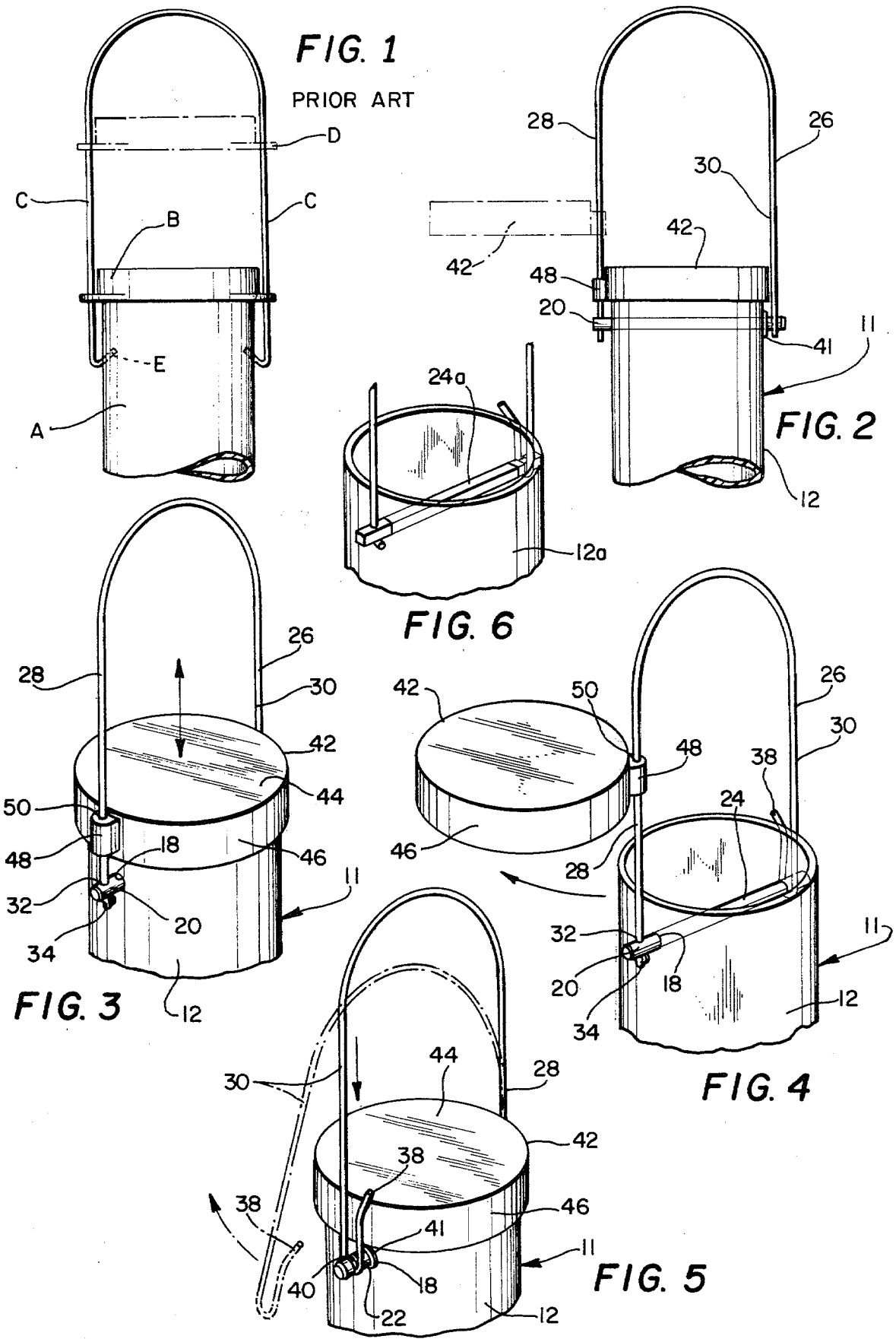

BIRD FEEDER CONSTRUCTION

BACKGROUND AND SUMMARY OF THE INVENTION

This invention relates to bird feeder constructions and particularly to an improved bird feeder of the type generally exhibiting a vertically oriented hollow tubular body adapted to receive bird feed and the like. The body is generally transparent and is provided with one or more openings in the sidewalls thereof such that the birds may place their heads partially into such openings in order to receive the seed stored therein. A basic bird feeder of the general type construction is shown and described in U.S. Pat. No. 3,568,641 issued Mar. 9, 1971.

Bird feeders of the aforementioned constructions generally include a U-shaped bail which is permanently or partially permanently attached to the sidewalls thereof in such a manner that the bail is not readily removable. Such bail attachment cannot easily be utilized to support the bird feeder construction on a running length support such as a tree branch and the like. Because of this, the bail is generally used in conjunction with a S-shaped support, the top of which engages the upper portion of the tree branch or other running length support and the bottom of which connects to the bail. In addition, with such type bird feeder constructions, a closure cap is usually provided at the open top end of the body such that access may be had so as to refill the housing with feed and to protect such feed from pests, rain, wind, etc. Such closures are usually provided with a pair of opposed ears through which the bail legs extend such that the closure may be slid upwardly and downwardly along the bail legs to respectively open and close the open body end. Such action does not enable the cap to be entirely removed and this sometimes makes it difficult to refill the container with feed. It is the above indicated disadvantages of prior art devices which the present invention is directed to eliminate.

Accordingly, an object of the present invention to provide a bird feeder construction of the type under consideration which enables relatively easy and uncomplicated removal of at least part of its bail support structure such that the device may be mounted on a running length support such as a tree branch and the like.

A further object of the present invention is the provision of a bird feeder construction of the aforementioned type which has a closure portion which is easier to remove so that full access to the open end of the container may be had to fill and remove contents therefrom.

These and other objects of the present invention are accomplished by the provision of a bird feeder and the like comprising a hollow vertically disposed housing including a tubular body adapted to receive feed and at least one opening in the peripheral sidewall thereof through which the birds may receive said feed, said housing further including a generally U-shaped wire bail having opposite legs thereof respectively connected to said housing adjacent its upper open end, one of said bails being removably supported such that removal therefrom enables the bail to be rotated about the other leg to facilitate support of such feeder construction, the normally open body upper end provided with a cover closure adapted for positioning thereover, said closure connected to only one of said bail legs for vertically slidable and horizontally rotatable movement with respect thereto such that free access for feed filling may be had through the normally open top of said body.

Other objects, features and advantages of the invention shall become apparent as the description thereof proceeds when considered in connection with the accompanying illustrative drawing.

DESCRIPTION OF THE DRAWING

FIG. 1 is a side elevational view of the upper portion of a known bird feeder construction;

FIG. 2 is a side elevational view of a bird feeder construction showing features of the present invention and particularly the ability of a cover to rotatably swing about one of the bail legs;

FIG. 3 is a perspective view of the top portion of a bird feeder construction of the present invention and shows in particular the manner in which the cover may vertically move with respect to the bail;

FIG. 4 is perspective view similar to FIGS. 2 and 3 and shows in particular the manner in which the cover may be rotated about its bail leg to fully expose the open end of the housing body;

FIG. 5 is a perspective view similar to FIGS. 3 and 4 but with the housing body displaced 180° such that the manner in which the other bail leg is easily removed from its supporting means is more fully illustrated; and FIG. 6 is a partial perspective view with parts removed for clarity showing a modified form which the support means may take.

DESCRIPTION OF THE INVENTION

Referring now to the drawing and in particular FIG. 1 thereof, one common form of a bird feeder construction is illustrated wherein an open tubular body A is provided with a closure B. The closure is in turn movable vertically between the position shown in the full lines and the position shown in the dotted line along a pair of opposed legs C of a supporting bail. The legs are in turn supported within openings in ears D extending from the closure on opposite sides thereof. The terminal ends E of the legs C bent inwardly so as to partially extend into the internal portions of the body A through openings provided for such purpose.

Referring now to FIGS. 2 through 5 of the drawing, the primary bird feeder construction 10 of the present invention is illustrated. Such feeder includes a housing 11 including a hollow tubular body 12 generally formed from a transparent or translucent plastic material and including perpheral sidewalls 14. The body 12 is provided with a bottom closure (not shown) and a normally open top defined by a circular rim 16.

A pair or circular openings 18 are provided on opposite sides of the body 12 through the sidewalls 14 and are adapted to receive the projecting ends 20 and 22 of a rod 24 extending therethrough. A U-shaped generally wire bail 26 having opposed downwardly extending legs 28 and 30 is supported on the rod 24 in the following manner. The rod end 20 is provided with an opening 32 through which the bail leg 28 extends. The terminal portion of the bail leg 28 is provided with a crimp 34 or other means such that once it passes through the opening 30, it may not be withdrawn. Such provides permanent attachment of the bail leg 28 to the housing 12 via the aforementioned connection to the support rod end 20. The other bail leg 30 terminates in an inverted open loop 36, the terminal leg of which is provided with an outwardly flared end portion 38. The loop 36 is adapted to frictionally engage an annular recess 40 provided in the rod end 22. In this manner then the bail leg 30 is frictionally removable in an easy and convenient manner from the housing simply by initially forcing the bail leg downwardly in the direction of the arrow until it is clear of the support end 22 and thereafter rotating or otherwise moving it clear of such post.

It should be pointed out that the bail in this position as shown in FIG. 5 by the dotted line representation is free to rotate in a horizontal plane about its permanent connection via the bail leg 28 and post end 20. This means provides the necessary freedom of movement such that the bail may be easily slipped over the running length of a supporting member such as a tree branch, a running length of rope and the like. The rod 24 is provided with a locking snap ring 41 frictionally engaged on end 22 such that lateral movement to the left as viewed in FIGS. 2 and 4 of the drawing will not permit the rod to slide out of its supported position with the body 12.

A cover 42, generally of cylindrical shape and including a top wall 44 and downwardly dependent flange 46 is provided as a closure for the open top of the body 12 and is adapted to rest upon the upper rim 16 in the manner depicted in the drawing. A single ear 48 which outwardly projects from the flange 46 is provided on the closure 42. Such ear includes a vertically oriented bore 50 extending therethrough and adapted to receive the bail leg 28. In this manner the closure 42 may vertically move up and down with respect to the body 12 along the bail leg 28 and further freely rotatable there around. This enables the closure 42 once elevated past the open rim 16 of the body 12 to freely rotate around the bail leg 28 to a position as shown in FIG. 4 wherein the entire open top of the body 12 is accessible. This is a particular convenience in filling such with feed to be dispensed by the present bird feeder construction. When it is desired to reclose the upper end of the body 12, the closure is simply rotated to a position vertically aligned with the body and allowed to slide downwardly to its closed position as shown in FIGS. 3 and 5.

Inasmuch as the rod 24 and its supporting openings 18 in the sidewalls 14 are circular in cross sectional configuration, the rod as well as the bail 28 connected thereto are free to pivot or rotate in a vertical attitude with respect to the body 12. In some cases, such movement is not desired and, accordingly, a rod 24a of non-circular geometric configuration, i.e., square, rectangular, and the like, may be provided as is shown in FIG. 6. In such cases, the body 12a is provided with openings corresponding to the shape of the rod 24a.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder and the like comprising a vertically disposed housing including a hollow tubular body adapted to receive and dispense feed, said housing further including a generally U-shaped wire-like bail having opposite legs thereof respectively connected to said housing adjacent opposed body sidewall positions at its upper end thereof and through which said body is supported in such vertical disposition, said body upper end being normally open and a top cover adapted for positioning over said normally open upper body end so as to close such in order to protect said seed from weather, feeding pests, and the like, said closure connected to only one of said bail legs for vertically slidable and horizontally rotatable movement with respect thereto such that free access for feed filling may be had to said body without removing either said cover from said bail or said bail from said body by initially sliding said cover upwardly out of contact with said body along said one bail leg and then subsequently rotating said cover around said bail to a position horizontally offset from said body so as to expose said open body top said cover having an outwardly extending ear through which a vertically oriented bore extends, said one of the bail legs extending through said bore whereby said cover is rotatable about said one bail leg, said bail legs connected to supporting means disposed on opposite sidewall portions near the open body top, the other of said bail legs frictionally releasably connected to said supporting means such that the bail may be moved relative to its connection by said one bail leg to both said closure and said supporting means such that the feeder may be easily released from a running length support.

2. The bird feeder construction of claim 1, said one bail leg further extending through an opening provided in its respective supporting means such that the position of said one bail leg is laterally fixed with respect to said body.

3. The bird feeder construction of claim 2, said cover ear bore and said supporting means opening being vertically aligned, said one bail leg vertically slidable with respect to said body.

4. The bird feeder construction of claim 1, said supporting means including opposite ends of a rod horizontally extending through said body and projecting from said sidewalls on opposite sides thereof said other one of said bail ends terminating in a reverse curved spring loop in turn adapted to frictionally engage an annular groove disposed in the rod end to which it is adapted to be connected, said loop being releasable from said rod end by downwardly moving said loop with respect to said rod.

5. The bird feeder construction of claim 4, said rod of a regular non-circular geometric cross-sectional configuration so as to be non-rotatably supported by said body such that said bail is continually supported in a vertical position.

* * * * *